United States Patent Office 2,806,826
Patented Sept. 17, 1957

2,806,826

PHENOL-MODIFIED GLASS FIBER REINFORCED AMINE-UREA-FORMALDEHYDE COMPOSITION AND PROCESS FOR PREPARING SAME

Edward Noonan Squire, Fairfax, Del., assignor to E. I. du Pont de Nemours and Company, Wilmington, Del., a corporation of Delaware No Drawing. Application July 23, 1954,
Serial No. 445,463

20 Claims. (Cl. 260—17.2)

This invention relates to phenol-modified amine-urea-formaldehyde resinous bodies reinforced with glass fibers.

The present invention is more particularly concerned with modifying an amine-urea-formaldehyde chain by reaction with a phenol, especially a bis-phenol, adding a sufficient amount of acid to form a latent catalyst, reinforcing the resulting mixture with glass fibers and thus obtaining a product (more particularly a post-formable sheet) which can readily be converted to high quality reinforced resin articles.

Phenol, resorcinol, or other phenolic compounds containing one or more hydroxyaryl groups can be used as the phenolic reactant in the process of this invention. However, the bis-phenols are preferred because they give products of excellent quality, especially from the standpoint of freedom from color. The phenolic reactant is preferably one which has been premethylolated. Thus, the bis-phenols which are employed may have, but need not necessarily have, one or more methylol groups attached to an aromatic nucleus.

The bis-phenols, whether or not containing methylol substitution, include compounds in which two hydroxyaryl groups are united either directly or through a bivalent radical such as —O—, —S—, —SO₂—, —CR'R"— (R' and R" being —H or alkyl), the bonding of the hydroxyaryl groups being at the para positions.

The modification of a urea-formaldehyde condensation product, especially an amine-modified urea-formaldehyde intermediate polymeric product, in particular embodiments, can be illustrated by means of the following equations (using a methylol derivative of 2,2-bis(4-hydroxyphenyl)propane as the illustrated phenolic reactant):

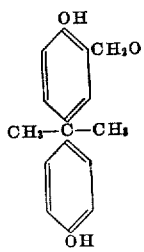

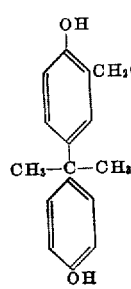

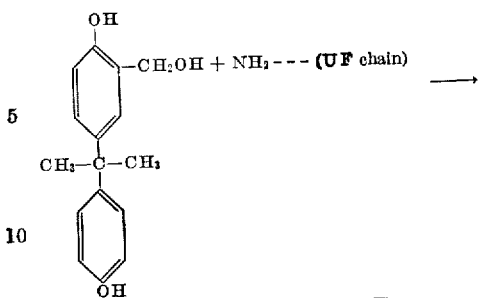

Corresponding reactions occur when the bis-phenol has dimethylol or trimethylol substitution.

It is to be understood that the urea-formaldehyde chain which is referred to in these equations may have a linear or branched structure. Various configurations are of course possible including polymethylene polyurea chains with methylol substitution on one or more of the nitrogen atoms within the chain. Moreover, it is to be recognized that the urea-formaldehyde chain may be a diorganized that the urea-formaldehyde chain may be a diamine-modified urea-formaldehyde chain. An example of the latter is

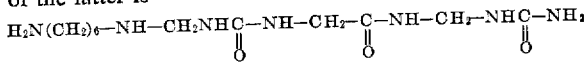

Hexamethylenediamine-modified

Products obtained by condensing hexamethylene diamine with a growing chain produced by condensation of methylolurea molecules are further described in U. S. Patent 2,668,155, of McClellan, and in U. S. Patent 2,691,638 of Kvalnes and Sherwood.

In the practice of this invention the amine modifiers are preferably so chosen as to give maximum strength and maximum moisture resistance. To achieve optimum properties, the amine constituent should preferably have not less than two, nor more than four, carbon atoms per —NH₂ group. Suitable examples are the alkyl amines, bis(aminoalkyl) ethers, and the diaminoalkanes, especially bis(aminopropyl) ether, isopropyl amine, tetramethylene diamine, hexamethylene diamine, etc. One of the important functions of the amine component is its capacity to impart a latent catalyst character to the uncured resin, upon addition of an amount of acid insufficient to lower the pH to below about 6. This latent catalyst property is present, in fact, even on the slightly alkaline side, as well as in slightly acidic mixtures, i. e. even when the amount of acid added is not sufficient to lower the pH to outside of the range of 6 to 9.5.

In one embodiment of the invention, as hereinabove noted, the phenolic reactant is one which has first been subjected to a premethylolation reaction, i. e., with aqueous formaldehyde containing an inorganic base such as sodium hydroxide or magnesium hydroxide. The pH of such phenol methylolation mixtures should be 7 to 9. When a bis-phenol is used, enough formaldehyde is preferably employed at this stage to bring the bis-phenol into solution (formaldehyde concentration being suitably 40% by weight, or 60% by weight, both of which are available from commercial sources). Methylolation of the phenol is permitted to take place at a temperature of about 60 to 80° C. for about 40 to 90 minutes. A part of the total urea may be added at this stage but this is not essential. Generally speaking, the urea should be added to a cooled reaction mixture, rather than to a warm reaction mixture. In another vessel a formaldehyde-amine solution is prepared (in the embodiment in which an amine modifier is used). The amine may, in the most outstanding embodiments of the invention, be a primary monoaminoalkane, a diaminoalkane or a bis-(aminoalkyl)-ether, such as bis(3-amino propyl)ether. Methylolation of the amine in such embodiments is permitted to continue at a temperature of about 35 to 55° C. for about 15 to 60 minutes, the pH being 7 to 9. This is accomplished by adding the amine to formaldehyde, preferably in excess, with stirring, the quantities of reactants being hereinafter disclosed. Urea is then introduced, and the mixture is heated gently, then allowed to stand at room temperature. The resulting solution is thereafter admixed, in a particular embodiment, with the methylolphenol-urea solution and the resulting mixture is heated at 35 to 55° C. for 15 to 60 minutes, or simply set aside for storage at room temperature, until it is desired to combine the mixture with glass fiber reinforcement. If desired at this stage, the reaction can be continued until bodying occurs, and this can be aided by removal of water if desired. Before bodying or immediately before admixing the ingredients with the glass fiber reinforcement, the mixture is made slightly acidic by adding a mineral acid such as phosphoric acid. Finally the mixture is dried under conditions hereinafter described in detail, whereby a post-formable thermosetting sheet is obtained.

In other embodiments of the invention various reinforcing fibrous materials may be employed in place of glass fibers. For example, cellulosic or silk fibers can be used, and indeed excellent results are obtained with synthetic fibers such as polyacrylonitrile, ethylene glycol polyterephthalate, and nylon fibers. Of special importance also is reinforcement with inorganic compounds, in fibrous or nonfibrous form, other than ordinary glass.

The acid curing agent which is added can of course be varied very widely, and may be an organic or inorganic acid, or an acidic salt such as ammonium chloride, ammonium sulfate, or ammonium phosphate; suitable acids include phosphoric, hydrochloric, sulfuric, formic, etc. The quantity of acid added need be no greater than is required to lower the pH below about 6. The fact that pH does not have to be below 6 is the reason why the reinforced resin can be dried in the form of a post-formable sheet, without premature curing. Actually the added curing agent evidently becomes attached to reactive groups in the resin or prepolymer molecule, and the curing catalyst may be regarded as the combination thus produced. Whatever the explanation, this combination has a latent catalyst character which permits the resin to be cured in a few minutes by heating at temperatures of 100°–150° C., or at lower temperatures at longer curing times.

The drying of the resinous product is carried out under conditions which permit removal of water without excessive increase in molecular weight. Low pressures, and only moderately increased temperatures (i. e. 30 to 70° C. at 100 to 300 mm. of Hg), are preferably employed. Rate of drying may be increased by use of circulating air, suitably at 50° C. for 1 to 5 hours. Evaporation of water is continued at least until the resin composition changes from a syrupy liquid to a tacky solid. The drying may be continued further if desired. There still remains chemically bound water, which is released during the final cure. The drying of the reinforced resin, at least in the final stage, is preferably carried out with the resin in the form of a sheet which is not so highly cross-linked as to preclude post-forming. The resulting post-formable sheet is sufficiently stable to be marked as such, for example as a replacement for steel sheet in the manufacture of automobile bodies.

Any of the known mechanical means for forming and drying a resinous sheet material may be employed. The sheet can be extruded and thereafter dried in a current of air, or if desired it can be formed in an extruder-drier of the type described in the copending application of Bernhardt, S. N. 425,985, filed April 27, 1954, now Patent No. 2,774,105; this type of extruder-drier comprises an extrusion screw rotating in a barrel in the usual way except for the presence in the screw of a zone of decreased root diameter, there being a port at the forward part of said zone, immediately behind a screw thread, communicating with a hollow core of said screw through which vapor is exhausted at diminished pressure. In the latter type of device the sheet can be extruded at any rate which is rapid enough to prevent premature curing, and the phenolic reactant which slows up the cure, has the effect of facilitating the extrusion of post-formable sheet in extension-extraction equipment.

The post-formable sheet can also be made by impregnating glass cloth with the resin, drying, and laminating two or more layers of the thus-impregnated cloth. This can be done at a temperature of 20 to 50° C. under a pressure of 0 to 5 p. s. i.

The products thus obtained can be cured, preferably when formed in a shaping means, at a temperature of 100 to 150° C.

One of the advantages of such post-formable sheets is their suitability for use in conventional steel fabrication equipment; also their adaptability to dyeing or pigmentation (pigment or dyes can be added along with the reinforcement, or the reinforcement may itself be colored), which eliminates the need for subsequent painting or lacquering. Such sheets are also adaptable to coating or partial coating with surface layers of other resins in film form, which permits a wide variety of designs, decorative effects, etc. The adhesive bonding of such surface covers can be achieved during formation of the post-formable sheet, or during the final stamping operations. The outer layer or coating may itself be a fiber-reinforced post-formable sheet of the same or other resin, containing in some instances, dyes, pigments or other suitable additives.

There are certain advantages in premethylolating the phenolic reactant. If the quantity of phenolic reactant is very small, or if the phenol is one which is unusually reactive, the premethylolation step can be omitted without serious consequence. On the other hand, if the phenolic reactant is about as reactive as the unsubstituted bis-phenols only a very small percentage of phenolic reactant can be used without premethylolation. For example, quantities of diphenylol-propane (i. e., 2,2-bis(4-hydroxyphenyl)propane) up to 0.025 mole per mole of urea can be admixed directly with the amine-urea-formaldehyde solution without premethylolation. This does not interfere adversely with the curing, nod does it have any appreciable influence upon wet stiffness, water absorption, or dimensional stability, in the final product. Larger quantities of diphenylolpropane, for example in excess of one mole per 4 moles of urea, cannot be added successfully to the amine-urea-formaldehyde solution, for when this is done much of the diphenylolpropane remains unreacted in the final product. Incorporation of quantities of the diphenylolpropane up to 0.25 mol per mole of urea, the urea being premethylolated, the F/U (total formaldehyde/total urea) mol ratio being 2/2, gave translucent to white opaque glass fiber laminates which retained only 71% of the original stiffness at 150° C. In similar experiments, the urea was premethylolated at an F/U ratio of 2.0 and 1.8 respectively. The water absorption capacity of the resulting products was high and laminates exhibited weakness upon being immersed in boiling water.

In view of the above, it is quite possible that the chemical reactions which occur when a non-premethylolated phenol is employed do not result in as extensive cross-linking during the final cure as those which take place when the phenolic reactant is premethylolated.

When employing non-premethylolated phenolic reactants it is not possible to overcome the water sensitivity of the final products by the use of high F/U ratio in the premethylolated urea solution to compensate for the lack of methylol groups in the phenolic reactant. The experiments thus showed that for the bis-phenols, and, in fact, for other phenolic reactants, premethylolation is highly desirable if strong water-insensitive products are to be obtained.

In a series of experiments in which various degrees of methylolation of the phenolic reactant were investigated it was determined that the trimethylol and dimethylol derivatives of 2,2-bis(4-hydroxyphenyl) propane were better than the monomethylol and tetramethylol derivatives respectively. The trimethylol and dimethylol derivatives were found to be about equally as good in water absorption capacity, there being some evidence, however, that the trimethylol derivative can be employed in somewhat lower concentrations and still maintain the same water resistance as the dimethylol derivative.

The following table (Table 1) indicates the water sensitivity of glass fiber reinforced final products obtained by modifying methylol hexamethylenediamine-urea-formaldehyde condensation products with premethylolated 2,2-bis-(4-hydroxyphenyl) propane. It is to be understood that in the methylolation of the phenolic ingredient the degree of methylolation can be controlled by employing an excess of formaldehyde, and stopping the reaction when the titration for free formaldehyde indicates the desired degree of methylolation.

is added 320 grams of urea (5.33 moles). The solution thus obtained is allowed to stand for 18 hours at 25° C. At the end of this time no free formaldehyde is present. The pH is about 7.0 and the viscosity is about 0.40 stoke. A second solution is prepared by mixing 79.5 grams of 37.8% formaldehyde (1 mole) cooled to 0° C. with 3.6 grams of hexamethylene diamine (0.031 mole) and adding 40 grams of urea (0.667 mole) to the stirred solution followed by heating for 30 minutes at 45° C. and storage for 24 hours at 25° C. To assist in adding the hexamethylene diamine, a minimum amount of water may be introduced with the hexamethylenediamine if desired. To obtain a premethylolated solution of the desired composition aliquot parts of the first solution and the second solution are admixed. For example, an aliquot part of the first solution containing 0.1 mole of premethylolated diphenylolpropane, 0.8 mole of formaldehyde, and 0.533 mole urea is admixed with all of the second solution using the quantity above described. The resulting mixture has the composition 1B/18F/12U (mol quantities), B signifying the diphenylolpropane reactant, F signifying total formaldehyde and U signifying total urea. The solution thus obtained after standing at 25° C. for 24 hours has a pH of 7.5 and is free of unreacted formaldehyde.

To the mixture obtained as above described is added a small quantity of acid catalyst (0.079 mole per 0.533 mole urea) and this mixture is used for impregnation of glass fiber cloth or mat. In the experiments recorded in the table the glass fibers are first coated with 2,4-dihydroxybenzoatochromic chloride. As will be seen from the results reported in the table, the amine reactant as well as the acid catalyst can be varied without departing from the procedural details just described.

It is to be noted that the foregoing table gives the

Table 1.—*Water sensitivity of glass fiber reinforced final products obtained by modifying methylol hexamethylenediamine-urea-formaldehyde condensation products with premethylolated 2,2-bis-(4-hydroxyphenyl) propane*

| Resin Composition [1] | Amine [1] Acid | Methylols per Bisphenol | Eq. Ratio: Acid/Amine | 1 Hr. Boil | | 3 Hr. Boil | |
|---|---|---|---|---|---|---|---|
| | | | | Percent Wt. Increase | Wet Stiffness | Percent Thickness Inc. | Percent Stiffness Retention Wet |
| 1B/6F/4U | isopropylamine-H$_2$SO$_4$ | 2 | 0.11 | 2.3 | High | | |
| 1B/6F/4U | isopropylamine-HCl | 2 | 0.56 | 4.6 | Low | | |
| 1B/6F/4U | isopropylamine-HCl | 2 | 0.45 | 1.6 | v. high | | |
| 1B/6F/4U | HMD [1]-H$_2$SO$_4$ | 2 | 0.225 | 1.5 | v. high | | |
| 1B/8F/4U | HMD-H$_2$SO$_4$ | 2 | 0.20 | 1.9 | v. high | | |
| 1B/8F/4U | HMD-H$_2$SO$_4$ | 2 | 0.15 | 1.4 | v. high | | |
| 1B/8F/4U | HMD-H$_2$SO$_4$ | 2 | 0.25 | 1.4 | v. high | | |
| 1B/6F/4U | HMD-H$_2$SO$_4$ | 2 | 0.2 | [2] 2.1 | | 3.9 | 86 |
| 1B/15F/10U | HMD-H$_2$SO$_4$ | 3 | 0.15 | [2] 3.2 | | 4.2 | 85 |
| 1B/8F/4U | NH$_4$Cl | 2 | | [2] 2.0 | | | |
| 1B/8F/5-33U | NH$_4$Cl | 3 | | [2] 1.3 | | | |

[1] HMD = hexamethylene diamine.
[2] 3 hour boil wt. increase.
B = 2,2-bis(4-hydroxyphenol) propane.
F = formaldehyde.
U = urea.

The general method employed in the comparative experiments reported in the table was as follows:

Into a glass vessel equipped with a reflux condenser and a stirring device is placed 228 grams of finely pulverized 2,2-bis(4-hydroxyphenyl)propane (1 mole) and 635 grams of 37.8% (by weight) aqueous formaldehyde (8 moles). This mixture is heated with stirring to 70° C. and to the resulting warm solution is added 0.035–0.04 mole of aqueous 5% sodium hydroxide which produced a pH of about 8.0–8.2. Heating of the solution at 70–75° C. is continued and small samples are removed periodically to test for free formaldehyde. (Note: The analysis indicated that the trimethylol derivative, or a mixture in which the average number of methylol groups per phenolic molecule was 3, was formed in about 60 to 90 minutes.) To the resulting mixture, after cooling, results obtained with the dimethylolated and trimethylolated 2,2-bis(4-hydroxyphenyl)propane-modified composition. Another series of experiments was performed with a tetramethylolated 2,2-bis(4-hydroxyphenyl)propane. In the latter experiments the F/U range was 1.2 to 2.5 and the F/B range was varied from 12 to 30. It was found that over these ranges of quantities of ingredients poor glass laminates were obtained using the tetramethylolated phenolic modifier. Some of these exhibited low stiffness when immersed in boiling water. Others exhibited high water absorption or heterogeneity. In other instances, considerable crazing or poor color were encountered. In general, it was apparent that the number of methylol substituents per mole of bisphenol should be about 2 to 3 for best results.

The mole ratio of formaldehyde/urea was found to be one of the variables which determines the water sensitivity of the product. Consistently good results from the standpoint of water absorption capacity were obtained when the F/U ratio was about 1.5:1 to 2.0:1. This is shown in the following table wherein the phenolic modifier was premethylolated 2,2-bis(4-hydroxyphenol)propane.

Table 2.—Water absorption as a function of F/U ratio

| Catalyst | F/U | F/B | Percent Wt. Increase | | |
|---|---|---|---|---|---|
| | | | 1 hr. | 2 hr. | 3 hr. |
| NH₄Cl | 2.0 | 8 | 2.1 | 2.2 | 2.0 |
| NH₄Cl | 1.5 | 8 | 1.6 | 1.3 | 1.3 |
| HMD-H₂SO₄ | 2.0 | 8 | 1.7 | 2.4 | 2.1 |
| HMD-H₂SO₄ | 1.5 | 6 | 1.5 | 1.9 | 1.7 |

When the F/U ratio was lowered to 1.0, the resulting laminate was weak and water resistance fell off markedly. The F/U ratio which could be employed was determined to some extent by the nature and quanity of the phenolic reactant. In this connection it is noteworthy that a composition which provides enough formaldehyde for dimethylolation of diphenylolpropane and enough formaldehyde also to provide 1.5 moles F per mole of U is superior to a composition which provides the same ingredients and in addition enough formaldehyde to produce tetra methylolation instead of dimethylolation.

It was known heretofore (Brooks and Kvalnes, S. N. 401,406, filed December 30, 1953) that in producing a thermosetting amine-modified urea-formaldehyde resin the acid component need not be added in sufficient quantity to produce a pH of less than 7. The catalyst under such circumstances is thus of a latent character. One of the problems of modifying similar resins with a phenolic modifier arises from the fact that the optimum pH for condensation of methylolphenols, in the manufacture of conventional phenol-formaldehyde resins is about 3 to 4. A surprising feature of the present invention is the discovery that the co-reaction of methylol phenols and methylol amine-UF can occur under mild pH conditions (6.5 to 9), and moreover, that there is a range of quantity of added acid which imparts a latent catalyst property to the composition as a result of which a cure can be effected without using the low pH heretofore required for commercial phenolic resins. While in U—F-hexamethylene diamine-HCl thermosetting compositions the acid/amine ratio (in terms of equivalents) is at an optimum at about 0.05, the corresponding optimum acid/amine ratio for the compositions containing a phenolic modifier is 0.14 to 0.6. This does not vary significantly from one mineral acid to another when the acids have substantially the same ionization constants, although for some reason which is not known with certainty, phosphoric acid is somewhat better than sulfuric acid. This is shown in the following table. The preparations described were made by the method hereinabove set forth.

Table 3.—Comparison of sulfuric acid with phosphoric acid as source of latent catalyst in biphenol-modified hexamethylene diamine UF

| | HMD-H₂SO₄, Percent of Original Stiffness After 3-Hour Boil | | Eq. Ratio: $\frac{H_2SO_4}{HMD}$ | HMD-H₃PO₄, Percent of Original Stiffness After 3-Hour Boil | | Eq. Ratio: $\frac{H_3PO_4}{HMD}$ |
|---|---|---|---|---|---|---|
| | Wet | Dry | | Wet | Dry | |
| 1B/18F/12U | 76 | 84 | 0.197 | 95 | 100 | 0.38 |
| 1B/24F/16U | 72 | 74 | 0.200 | 91 | 87 | 0.41 |

Phosphoric acid is considered herein to be dibasic rather than tribasic because of the very low ionization constant of the third hydrogen. Data on the effect of amine/acid ratio (equivalents) are presented in Table 4. The weight loss (or gain), and the thickness increase, reported in the table apply to the samples employed in the 3-hour boiling water test. The samples were dried to constant weight before making these measurements.

Table 4.—Variation of amine/acid ratio and its influence on water resistance

| Composition | Catalyst, H₂SO₄/HMD | 3-Hour Boil Data | | | | |
|---|---|---|---|---|---|---|
| | | Percent Wt. Gain¹ | Percent Wt. Loss¹ | Percent Thickness Increase | Percent Retention of Stiffness | |
| | | | | | Wet | Dry |
| 1B/8F/4U | 0.15 | 2.1 | -2.0 | 3.2 | 75 | |
| 1B/8F/4U | 0.20 | 2.1 | -2.2 | 3.9 | 86 | |
| 1B/8F/4U | 0.25 | 2.1 | | | | |
| 1P/8F/4U | 0.20 | 2.6 | | 4.1 | 79 | |
| 1P/8F/4U | 0.30 | 2.8 | 4.6 | 6.8 | 59 | 76 |

¹ "Wt. Gain" is the increase in weight of the laminate during the test. "Wt. Loss" is the decrease in weight of the laminate during the test.

Similar experiments with other amines established the fact that the same range of amine/acid ratio is effective, regardless of the amine used, within the class of amines herein disclosed. For example, isopropyl amine, when used in compositions having proportions of ingredients represented by the expression 1B/8F/4U, has the effect of imparting maximum water resistance at acid/amine ratios of 0.1:1 to 0.3:1. In the latter compositions when the acid amine ratio is 1:1 or higher there is an appreciable weight loss upon immersion of the glass laminate in boiling water for 1 hour (e. g., where the quantity of catalyst is greater than 0.6 mole per 61.2 g. of 1B/8F/4U). For example, when the number of mols of isopropyl amine.HCl was 0.086 mole per 61.2 g. of 1B/8F/4U, this weight loss was less at lower concentrations of catalyst, but excessive crazing with this type of catalyst was experienced upon exposure of the laminates to boiling water.

An amine component which gave outstanding results in combination with the bisphenol (2,2 bis(4-hydroxyphenyl)propane) modifier was bis (3-aminopropyl) ether. The following table shows the results obtained with this amine, compared with hexamethylene diamine.

Table 5.—A comparison of bis-(3-aminopropyl)ether and hexamethylene diamine as latent catalyst components

| Composition (U, F, and Bisphenol ingredients) | Catalyst (moles) | 3-Hour Boil | | | | | |
|---|---|---|---|---|---|---|---|
| | | Percent Wt. Change | | Percent Thickness Change | | Percent Stiffness Retention | |
| | | Gain | Loss | Wet | Dry | Wet | Dry |
| 1B/24F/16U | $\frac{303^* \text{ diamine}}{H_2SO_4} = 0.20$ | 1.7 | 2.3 | 2.9 | 2.3 | 80 | 80 |
| 1B/24F/16U | $\frac{HMD^{**}}{H_2SO_4} = 0.20$ | 3.9 | 2.9 | 5.7 | 2.2 | 72 | 74 |

*An abbreviation for bis-(3-aminopropyl(ether); mol quantities: bisphenol 0.1, urea 1.603, formaldehyde 2.4, NaOH 0.0035, diamine 0.0725 equivalents, sulfuric acid 0.018 equivalents.
**Mol equivalents: bisphenol 0.1, urea 1.603, formaldehyde 2.4, NaOH 0.0035, diamine 0.0824, sulfuric acid 0.0200.

The superiority of bisphenols over monocyclic phenols as modifiers in certain UF reaction systems (ammonium chloride catalyst, except where HMD was used) is shown by the following data. The comparisons provided in Table 6 are based on results obtained with glass fiber-reinforced laminates prepared by the general method hereinabove described.

Table 6.—*Effect of various phenols on the water sensitivity of glass-fiber reinforced UF resin compositions (100 hour immersion in boiling water)*

| Composition (Mols) | Flex. Mod., Percent Retention | | Thickness, Percent Change | | Weight, Percent Change | |
|---|---|---|---|---|---|---|
| | Wet | Dry | Wet | Dry | Wet | Dry |
| B/U/F (0.084/0.448/0.672) | 93 | 96 | +0.7 | −0.8 | −0.8 | −5.3 |
| B/U/F (0.1/1.2/1.8) | 100 | 86 | +3.3 | −1.4 | −1.2 | −8.3 |
| HMD/U/F (0.2/2.0/3.0) | 56 | 74 | +5.9 | −4.4 | −1.7 | −12.1 |
| Phenol/U/F (0.15/1.0/1.45) | 55 | 66 | +9.3 | +5.5 | −2.1 | −12.1 |
| Resorcinol/U/F (0.1/1.0/1.5) [1] | 26 | 35 | +2.7 | −2.5 | −13.0 | −26.9 |

[1] Catalyst=0.1 isopropylamine+0.013 H₂SO₄.

The invention is illustrated further by means of the following examples.

*Example 1.*—To 240 grams of formaldehyde (in 36% solution) was added 94.1 grams of liquid phenol and 40 milliequivalents of sodium hydroxide (in 5 N solution). The solution was heated under nitrogen at 70° C. for 245 minutes until 1.5 moles of formaldehyde had reacted. To the warm solution there was added 240 grams of urea and heating continued 5 minutes. The solution was then allowed to stand 24 hours at room temperature in a stoppered flask.

To 100 grams of the above solution was added 2.4 grams of hexamethylene diamine in 8.05 ml. of 5% sulfuric acids. The solution was then warmed 15 minutes at 70° to effect solution of the precipitate and then laid on 2,4-dihydroxybenzoato chromic chloride treated glass cloth. The resulting sheets were dried for 3 days at room temperature, whereby the resin composition became a tacky solid.

A 6 ply laminate (47.3% resin) was prepared by pressing the dried sheets together at 100° C. and 70 p. s. i. for 20 minutes. When kept in boiling water for one hour the laminate gained 0.4% weight and appeared as strong after boil as before.

*Example 2.*—To 225 grams of formaldehyde (in 36% aqueous solution) was added 114 grams of diphenylolpropane and 40 milliequivalents of sodium hydroxide and the solution heated for 65 minutes at 70° until 1.4 moles of formaldehyde had reacted; 300 grams of urea was added and heating continued until all of the formaldehyde had reacted.

To 100 grams of the above solution was added 2.32 grams hexamethylene diamine in 5.5 milliequivalents (9.85 milliequivalents) of aqueous sulfuric acid; the resulting mixture was heated to effect solution of the precipitate and then placed on heat treated glass cloth. After drying for 2.5 days at room temperature, and one hour at 79° C., 100–200 mm., a 6 ply laminate was prepared by pressing the resulting tacky sheets at 66 p. s. i. and 145° C. An attractive laminate was thus obtained.

*Example 3.*—Formalin was admixed with urea and hexamethylene diamine (mol proportions 1.8:1:0.18), and 0.05 equivalent sulfuric acid was added, per equivalent of hexamethylene diamine. To the mixture was added 0.18 mol resorcinol, and glass mat was impregnated with the resulting solution. The impregnated mat was heated for 1.5 hours at 75° C. in a drying oven, after which it was heated for 15 minutes in a press at 120° C. under a pressure of 500 p. s. i. The density of the resulting product was 1.69; it had a compressive strength of 49,000 p. s. i. and a flexural modulus of $1.57 \times 10^6$ p. s. i., and a flexural strength of 23,600 p. s. i. (A. S. T. M. D790). It absorbed 2.2% water in a one-hour boiling test.

*Example 4.*—To 180 grams formaldehyde (in 36% solution) was added 228 grams diphenylolpropane and 45 milliequivalents of sodium hydroxide; the solution was heated at 70° for 55 minutes and 240 grams of urea added. Heating was continued until the formaldehyde had reacted entirely. To 100 grams of the above solution there was added 50 milliequivalents tetramethylene diamine in 5% sulfuric acid (17.1 milliequivalents); pH of the resulting solution was 7.8. The solution was spread on heat treated cloth, after which the sheets were dried at 79° for one-half hour at 100–200 mm., to produce a tacky resin composition. These sheets were laminated at 50–100 p. s. i. and 115° C., giving an excellent laminate.

*Example 5.*—To 300 grams of cold formaldehyde (in formalin) there was added 59 grams of isopropylamine and 600 grams of urea. The solution was warmed to room temperature and allowed to stand until the formaldehyde had reacted.

A second solution was prepared by dissolving 141.2 grams phenol in 135 grams of formaldehyde (in formalin) and 40 milliequivalents of sodium hydroxide. The solution was heated for 90 minutes until 2.48 equivalents of formaldehyde had reacted.

To 149.3 grams of the first solution there was added 52.5 grams of the second solution and the mixture heated for 1 hour; to the resulting solution there was added 9 milliequivalents of sulfuric acid. No precipitation occurred during the mixing and subsequent heating; this is an advantage over the previous cases. Glass fabric and kraft paper were impregnated with the solution and the resulting sheets were dried for 2 hours at 50° C., 100–200 mm., and one day at room temperature. Good laminates were readily obtained from these dried sheets by heating at 110° C. and 100 p. s. i.

*Example 6.*—One mole of urea, 1.5 moles of formaldehyde, and 0.1 mole of isopropylamine were pre-reacted as described in Example 5. To the rapidly stirred solution there was added 0.1 mole of resorcinol and 0.013 mole of sulfuric acid; glass fabric cloth was impregnated with the solution and the resulting sheets were dried for 5 hours at 50° C., 100–200 mm. After standing at room temperature overnight the tacky sheets were laminated at about 100 p. s. i. and 140° C.

*Example 7.*—To 240 grams of formaldehyde (in aqueous 37.8% solution) there was added 228 grams of diphenylolpropane and 35 milliequivalents of sodium hydroxide. The solution was heated at 75° C. until 3.0 moles of formaldehyde had reacted; 5.33 moles of urea were then added and the solution allowed to stand until complete reaction of the formaldehyde had occurred.

A second solution was prepared by dissolving 31 millimoles of hexamethylene diamine in 1000 millimoles of formaldehyde and adding 667 millimoles of urea after which the solution was warmed to 45° C. for ½ hour.

The second solution was added to 119 grams of the previous solution and 15.7 milliequivalents of phosphoric acid (1 N acid based on 2 ionizations) was added.

The mixture was then laid on 2,4-dihydroxybenzoato-chromic chloride treated glass cloth and after drying at 25° C., R. H. 35%, for 24 hours, then at 50°, 100–200 mm. for one-half hour, the sheets were laminated at 50 p. s. i. and 110° C., giving an excellent laminate.

*Example 8.*—To 48 grams of cold formaldehyde (in 37.8% aqueous solution) was added 4.8 grams of bis-(3-aminopropyl)-ether and 64.6 grams of urea. The solution was warmed at 45° C. for 30 minutes and then 119 grams of the first solution described in Example 7 is added. The resulting solution was allowed to stand overnight to complete the methylolation (heating for 20–30 minutes at approximately 45°) and then 18 milliequivalents of sulfuric acid (in 5% aqueous solution) was added.

Glass fabric was impregnated with the solution and the sheets were dried for 72 hours at 25°, 40% R. H., followed by 2 hours at 50° C., 100–200 mm. The sheets then felt dry to the touch, having lost their tacky character. Good laminates were made from these sheets at 400 p. s. i., 125° C., and also at 1000 p. s. i., 125° C.

The foregoing examples are illustrative, and it is to be understood that other embodiments of the invention will occur to those who are skilled in the art. The invention, for instance, is not limited to compositions which remain homogeneous throughout all steps in the process. By way of illustrating that point, a series of experiments was performed. In the first of these experiments 45.0 grams formaldehyde (as formalin) was admixed with 28.5 grams 2,2-bis(4-hydroxyphenyl)propane, 60.0 grams urea and 5 grams isopropyl amine. The mixture was heated at 70° C. for 0.5 hour, the mixture became cloudy and an oil separated upon cooling. In the second experiment of this series, to 240 grams formaldehyde (as formalin) was added 228 grams 2,2-bis(4-hydroxy-phenyl)propane and 23.6 grams of isopropylamine. After heating this mixture for 0.5 hour at 60° C. an oil separated from the solution. In the third experiment, to 180 grams formaldehyde (as formalin) was added 228 grams of 2,2-bis(4-hydroxyphenyl)propane, and 45 milliequivalents of sodium hydroxide (5% solution) was introduced. The mixture was heated at 70° C. for 105 minutes, at the end of which time urea (240 grams) was added, and the solution was allowed to stand overnight. To 100 grams of this solution was added 2.32 grams hexamethylene diamine, which caused immediate formation of a white precipitate. In a fourth experiment of the same series the preceding experiment was repeated except that 0.0086 equivalent of sulfuric acid was added to 100 grams of the bisphenol solution, following which the diamine was added. No precipitation occurred during the initial addition of the diamine, but when the pH rose to about 8.5, a white precipitate formed, the quantity of which, however, was not as great as that produced in the third experiment. The fifth experiment of this series was the same as the third experiment except that 9 milliequivalents of sulfuric acid (in 5% sulfuric acid solution) was added to 100 grams of the bis-phenol solution, after which 40 milliequivalents of isopropyl amine was added. The pH of the resulting solution was about 8.5. No precipitate was observed. In a sixth experiment of this series the third experiment was repeated except that 10.5 milliequivalents of isopropyl amine was added to 100 grams of the bisphenol solution. No precipitation was observed. Finally, a seventh experiment was performed wherein 94.1 grams of phenol and 40 milliequivalents of aqueous sodium hydroxide (5% solution) was added to 240 grams formaldehyde (as formalin). The solution was heated for 15 minutes at 70–74° C. to effect premethylolation and to the resulting mixture urea (240 grams) was added. To 100 grams of the resulting solution was added 2.4 grams hexamethylene diamine in 12.3 milliequivalents sulfuric acid (5% aqueous solution). A precipitate formed which became dissolved upon heating the solution for 15 minutes at 70°–74° C. In each instance a mixture was obtained which could be applied to glass mat to form sheets which could be laminated to give attractive laminated products.

As illustrated in the foregoing examples the impregnated mat or sheet, before lamination, should be dried until the resin is dry to the touch, or until the drying has proceeded at least to the stage at which the resin composition is tacky. The initial solution, as applied to the glass fibers, is of a watery consistency, or is of a syrupy character. As the drying continues the resin composition changes character, from a syrupy liquid (at room temperature) to a tacky solid. At that stage of dehydration the impregnated fibers can be laminated at low pressures (i. e., not in excess of 100 p. s. i.) or at much higher pressures if desired. If the dehydration is continued until the resin composition feels dry, rather than tacky, a higher pressure must be used in the lamination step. These changes in the resin composition take place at water contents which vary from one resin to another, to some extent, and in fact, as a practical matter it is better to determine whether or not drying has proceeded to an appropriate level by observing the character of the resin compositions, as above indicated, rather than by performing chemical analyses for the water content thereof. Accordingly, in the following claims, the term "drying" is to be interpreted to mean removal of water at least until the resin composition changes from a syrupy mixture to one of tacky consistency, and the term "substantially dry" is to be interpreted to mean the degree of dryness produced when the removal of water has progressed at least to the extent necessary to produce this change from a syrupy to a tacky character.

The pressure required for lamination at any particular temperature depends not only on the factors hereinabove described, but also to some extent on the rate at which the pressure increase is imposed, and the rate of cure. Thus when the pressure is raised very rapidly, little or no cure occurs during the short interval of changing pressure, hence the pressure ultimately applied can be lower than when the pressure increase is so slow as to permit the cure to progress while the pressure is changing.

The invention is especially valuable in the production of postformable compositions which take their final shape upon being heated under sufficient pressure to cause the desired final shaping. Examples of such operations are: production of automobile fenders, automobile body parts, building construction units, panels, etc.

I claim:

1. A substantially dry, fiber-reinforced, postformable, thermosetting sheet, comprising fibrous reinforcement incorporated in a reaction product of a phenol with a water-soluble N-methylol-containing reaction product of an N-methylol primary amine with a urea-formaldehyde condensation product, said primary amine having from 2 to 4 carbon atoms per —NH$_2$ group and being a member of the class consisting of monoaminoalkanes, bis-(aminoalkyl)ethers, and diaminoalkanes, said condensation product being one which is produced at a pH of 6 to 9.5 in an aqueous medium, said postformable sheet being further characterized in that it contains a latent curing catalyst, said latent catalyst being the product formed by admixing, with the reaction product formed from the said phenol and the said N-methylol-containing reaction product, an acidic compound in such quantity that it does not lower the pH of the resulting mixture to below 6, followed by drying the resulting mixture; the relative quantities of ingredients in the said composition being 0.25 to 0.65 part of free and combined formaldehyde, and 0.003 to 0.25 part, unmethylolated weight, of primary amine per 1.0 part of combined weight of said formaldehyde, amine, urea and phenolic compound, the molar ratio of urea: phenolic compound being 50:1 to 3:1.

2. Composition of claim 1 wherein the said fiber reinforcement is composed of alumina.

3. Composition of claim 1 wherein the said fiber reinforcement is composed of a cellulosic fiber.

4. Composition of claim 1 wherein the said fiber reinforcement is composed of glass fibers.

5. Composition of claim 1 wherein the said fiber reinforcement is composed of glass fibers coated with 2,4-dihydroxybenzoatochromic chloride.

6. Composition of claim 1 wherein the said fiber reinforcement is in the form of glass cloth.

7. Process of claim 1 wherein the said phenol is monohydroxybenzene.

8. Composition of claim 1 wherein the said phenol is resorcinol.

9. Composition of claim 1 wherein the said phenol contains aromatic methylol substitution.

10. Composition of claim 1 wherein the said phenol is a p,p'bis-phenol.

11. Composition of claim 1 wherein the said phenol is a methylol 2,2-bis(4-hydroxyphenyl)propane, having said methylol attached to an aromatic ring directly.

12. Composition of claim 1 wherein the said amine is isopropyl amine.

13. Composition of claim 1 wherein the said amine is bis-(aminoalkyl)ether.

14. Composition of claim 1 wherein the said amine is hexamethylene diamine.

15. Composition of claim 1 wherein the said acidic compound is phosphoric acid.

16. Composition of claim 1 wherein the said acidic compound is sulfuric acid.

17. Composition of claim 1 wherein the said acidic compound is ammonium chloride.

18. A process for preparing a phenol-modified reaction product of formaldehyde, a primary amine, and urea, which comprises heating aqueous formaldehyde with a phenolic compound in the presence of an alkaline additive which increases the pH to 8, at a temperature of 70° C., the quantity of formaldehyde being at least one mol per mol of phenolic compound, admixing the resulting methylolphenolic product with a water-soluble reaction product of an N-methylol primary amine with a urea-formaldehyde condensation product, said primary amine having from 2 to 4 carbon atoms per —NH$_2$ group, and being a member of the class consisting of monoamino-alkanes, bis-(aminoalkyl)ethers, and diaminoalkanes, said condensation product being one which is produced at a pH of 6 to 9.5 in an aqueous medium, said water-soluble reaction product being formed by reaction of said N-methylol amine with said condensation product at a temperature of 25°–45° C., and at a pH of 6 to 9.5, admixing an acidic compound with the product formed by the reaction of said methylolphenolic compound with said water-soluble reaction product, in such quantity as to produce a pH not lower than 6, incorporating glass fiber reinforcement therewith, and evaporating water from the resulting mixture, the mixture in at least the final stages of drying being in sheet form, continuing the drying until the mixture is substantially dry, whereby a portformable thermosetting sheet is obtained, the quantities of ingredients of said product being 0.25 to 0.65 part of free and combined formaldehyde, and 0.003 to 0.25 part, unmethylolated weight, of primary amine per 1.0 part of combined weight of said formaldehyde, amine, urea and phenolic compound, the molar ratio of urea:phenolic compound being 50:1 to 3:1.

19. Process of claim 18 wherein said phenolic compound is 2,2-bis(4-hydroxyphenyl)propane.

20. Process of claim 19 wherein the said primary amine is hexamethylene diamine.

References Cited in the file of this patent

UNITED STATES PATENTS

| | | |
|---|---|---|
| 2,098,869 | Harmon et al. | Nov. 9, 1937 |
| 2,609,352 | Kvalnes | Sept. 2, 1952 |
| 2,668,155 | McClellan | Feb. 2, 1954 |
| 2,691,638 | Kvalnes et al. | Oct. 12, 1954 |

UNITED STATES PATENT OFFICE

CERTIFICATE OF CORRECTION

Patent No. 2,806,826                                                September 17, 1957

Edward Noonan Squire

It is hereby certified that error appears in the printed specification of the above numbered patent requiring correction and that the said Letters Patent should read as corrected below.

Column 4, lines 20 and 21, for "extension-extraction" read --extrusion-extraction--; line 58, for "nod" read --nor--; line 68, for "2/2," read --2.2.,--; column 9, line 38, for "acids" read --acid--; column 14, line 11, for "portformable" read --postformable--.

Signed and sealed this 12th day of November 1957.

(SEAL)
Attest:
KARL H. AXLINE

Attesting Officer

ROBERT C. WATSON
Commissioner of Patents